United States Patent
Han et al.

(10) Patent No.: US 9,425,699 B2
(45) Date of Patent: Aug. 23, 2016

(54) MULTI-OUTPUT POWER SUPPLY APPARATUS ENHANCING A POWER IMBALANCE BETWEEN MULTIPLE OUTPUTS

(71) Applicant: SAMSUNG ELECTRO-MECHANICS CO., LTD., Suwon, Gyunggi-do (KR)

(72) Inventors: Dae Hoon Han, Gyunggi-do (KR); Jae Shin Lee, Gyunggi-do (KR); Seo Hyung Kim, Gyunggi-do (KR); Jung Sun Kwon, Gyunggi-do (KR); Bo Hyun Hwang, Gyunggi-do (KR); Joon Youp Sung, Gyunggi-do (KR)

(73) Assignee: SOLUM CO., LTD., Suwon-Si, Gyeonggi-Do (KR)

( * ) Notice: Subject to any disclaimer, the term of this patent is extended or adjusted under 35 U.S.C. 154(b) by 123 days.

(21) Appl. No.: 13/838,007

(22) Filed: Mar. 15, 2013

(65) Prior Publication Data

US 2014/0160806 A1 Jun. 12, 2014

(30) Foreign Application Priority Data

Dec. 10, 2012 (KR) .......................... 10-2012-0142923

(51) Int. Cl.
*H02M 3/335* (2006.01)

(52) U.S. Cl.
CPC ................ *H02M 3/33561* (2013.01)

(58) Field of Classification Search
CPC .... H02M 3/28; H02M 3/338; H02M 3/3385; H02M 3/33569; H02M 3/3376; H02M 3/33507; H02M 3/3384; H02M 3/3388; H02M 3/3372; H02M 3/3378; H02M 2001/09; H02M 3/33561
USPC ................ 363/15, 16, 17, 18, 19, 20, 21.01, 363/21.02, 22, 23, 24, 25, 26, 97; 323/267
See application file for complete search history.

(56) References Cited

U.S. PATENT DOCUMENTS

| | | | |
|---|---|---|---|
| 8,194,419 B2 | 6/2012 | Ryu et al. | |
| 2001/0036087 A1* | 11/2001 | Raets et al. | ..................... 363/17 |

(Continued)

FOREIGN PATENT DOCUMENTS

| | | |
|---|---|---|
| CN | 1926752 A | 3/2007 |
| CN | 101299575 A | 11/2008 |

(Continued)

OTHER PUBLICATIONS

Gu et al., IEEE Thesis (Title: A Simple Structure of LLC Resonant DC-DC Converter for Multi-output Applications, Published 2005, pp. 1485-1490).

(Continued)

*Primary Examiner* — Adolf Berhane
*Assistant Examiner* — Alex Torres-Rivera
(74) *Attorney, Agent, or Firm* — McDermott Will & Emery LLP (57) ABSTRACT

There is provided a multi-output power supply apparatus capable of maintaining multiple output voltages in a balanced state by limiting a variable range of a switching duty according to a load state. The multi-output power supply apparatus includes: a power supply unit switching input power to output a plurality of voltages whose power levels are determined according to the switching operation; and a controller detecting power states of at least some of the plurality of voltages from the power supply unit, and limiting a range of a switching duty of the power supply unit to a pre-set range when the detected power states correspond to a pre-set limited power state.

12 Claims, 5 Drawing Sheets

(56) References Cited

U.S. PATENT DOCUMENTS

| | | | | |
|---|---|---|---|---|
| 2002/0186026 | A1* | 12/2002 | Elferich | H02M 3/33561 324/652 |
| 2007/0297198 | A1* | 12/2007 | Chang | 363/17 |
| 2008/0266910 | A1 | 10/2008 | Kim et al. | |
| 2009/0027022 | A1* | 1/2009 | Oyama | H02M 3/07 323/282 |
| 2011/0085355 | A1* | 4/2011 | Adragna | 363/21.03 |
| 2011/0096571 | A1* | 4/2011 | Usuda | H02M 3/157 363/21.1 |

FOREIGN PATENT DOCUMENTS

| | | |
|---|---|---|
| CN | 101355300 A | 1/2009 |
| CN | 102044972 A | 5/2011 |
| KR | 1020010073270 A | 8/2001 |
| KR | 10-2009-0102948 A | 10/2009 |
| WO | WO 2004051831 A1 * 6/2004 | ............ H02M 3/155 |

OTHER PUBLICATIONS

Korean Office Action with Full English Translation issued in Korean Patent Application No. 10-2012-0142923 mailed Nov. 8, 2013.

Office Action issued Oct. 26, 2015 in related Chinese Application No. 201310114405.3 (English translation provided).

* cited by examiner

MULTI-OUTPUT POWER SUPPLY APPARATUS ENHANCING A POWER IMBALANCE BETWEEN MULTIPLE OUTPUTS

CROSS-REFERENCE TO RELATED APPLICATIONS

This application claims the priority of Korean Patent Application No. 10-2012-0142923 filed on Dec. 10, 2012, in the Korean Intellectual Property Office, the disclosure of which is incorporated herein by reference.

BACKGROUND OF THE INVENTION

1. Field of the Invention

The present invention relates to a multi-output power supply apparatus for resolving a power imbalance between multiple outputs in the case of a simultaneous occurrence of an excessively light load and an overload.

2. Description of the Related Art

Power supply apparatuses have been widely used in commercially-used electronic devices, and the like, as well as in information technology devices such as personal computers, and the like, and home appliances such as air-conditioners, audio systems, visual display devices, and the like.

The power supply apparatuses may provide a plurality of output voltages depending on the electronic devices to which the power supply apparatuses are applied.

A general multi-output power source supply device converts input DC power into AC power through a transformer and then rectifies the converted AC power, respectively, to output a plurality of DC voltages.

However, the general multi-output power source supply device has a problem in that when a voltage level of a single DC voltage, among the plurality of DC voltages, is changed by the transformer, the remaining DC voltages are affected so cross-regulation is not maintained.

To solve this problem, a multi-output power supply apparatus employing a step-down chopper circuit (or a buck chopper circuit) in an output terminal thereof has been used.

The step-down chopper circuit may include a switch, a free-wheeling diode, and a filter.

Thus, the general multi-output power supply apparatus has a problem in that re-conversion of power by the step-down chopper circuit after primary power conversion degrades power conversion efficiency and the presence of the step-down chopper circuit increases the number of components, resulting in an increase in fabrication costs.

In order to solve the problem, a multi-output power supply apparatus, like that of the related art document below, that controls switching of an output terminal upon being synchronized with a switching terminal of a power conversion terminal is known However, in the multi-output power supply apparatus, a power imbalance among multiple output voltages may occur due to an imbalance in a switching duty ratio in the occurrence of an excessively light load or overload.

RELATED ART DOCUMENT (Patent document 1) Korean Patent Laid Open Publication No. 10-2009-0102948

SUMMARY OF THE INVENTION

An aspect of the present invention provides a multi-output power supply apparatus capable of maintaining multiple output voltages in a balanced state by limiting a variable range of a switching duty according to a load state.

According to an aspect of the present invention, there is provided a multi-output power supply apparatus including: a power supply unit switching input power to output a plurality of voltages whose power levels are determined according to the switching operation; and a controller detecting power states of at least some of the plurality of voltages from the power supply unit, and limiting a range of a switching duty of the power supply unit to a pre-set range when the detected power states correspond to a pre-set limited power state.

The controller may include: a current generation unit generating a current according to power states of at least some of the plurality of voltages output from the power supply unit; a signal generation unit generating a pulse signal having a frequency determined according to the current generated by the current generation unit; a monostable unit determining a timing of a signal according to a pulse signal from the signal generation unit; a driving unit generating a switching signal for controlling the switching of a switching unit according to a timing of the monostable unit; and a duty range limiting unit limiting a duty range of the pulse signal from the signal generation unit when the power states of some of the plurality of voltages correspond to the limited power state.

The duty range limiting unit may include: a maximum/minimum value controller setting a maximum value and a minimum value of the pulse signal according to a control signal indicating that states of some voltages correspond to the limited power state; and a duty controller limiting a duty range of the pulse signal from the signal generation unit according to the maximum value and the minimum value from the maximum/minimum value controller.

The maximum/minimum value controller may include: a switch performing a switching operation to allow a current from a current source to flow; a comparator controlling switching of the switch by comparing the control signal with a detection signal obtained by detecting the current flowing in the switch; and a current mirroring circuit setting a maximum value and a minimum value by mirroring the current flowing from the current source according to the switching operation of the switch.

The duty controller may include: a comparator comparing a pre-set reference voltage with a detected power state; a comparator group including a plurality of comparators comparing a comparison result from the comparator with the maximum value and the minimum value, respectively; and a switch group including a plurality of switches switching a signal path to provide a corresponding signal according to the comparison result from the comparator and the comparison results from the plurality of comparators of the comparator group.

The power supply unit may include: a switching unit including at least two switches connected between an input power terminal to which the input power is input and a ground in series and switching the input power; a transformer unit transforming a voltage level of the power switched by the switching unit; and an output unit stabilizing output power from the transformer unit to output a plurality of pre-set voltages.

The transformer unit may include: a resonant tank providing an inductor-inductor-capacitor (LLC) resonating operation of the switching unit; and a transformer including a primary winding receiving switched power from the switching unit and a plurality of secondary windings forming a pre-set wiring ratio with the primary winding and outputting a plurality of voltages.

The power supply unit may further include: a rectifying and smoothing unit rectifying and smoothing alternating current (AC) power; and a power factor correction unit correcting a power factor of the DC power from the rectifying and smoothing unit and supplying the same to the switching unit.

According to another aspect of the present invention, there is provided a multi-output power supply apparatus including: a power supply unit switching input power to output a first power and a second power whose power levels are determined according to the switching operation; and a controller detecting a power state of the second power from the power supply unit, and limiting a range of a switching duty of the power supply unit to a pre-set range when the detected power state corresponds to a pre-set limited power state.

The controller may include: a current generation unit generating a current according to a power state of the second power output from the power supply unit; a signal generation unit generating a pulse signal having a frequency determined according to the current generated by the current generation unit; a monostable unit determining a timing of a signal according to a pulse signal from the signal generation unit; a driving unit generating a switching signal for controlling the switching of a switching unit according to a timing of the monostable unit; and a duty range limiting unit limiting a duty range of the pulse signal from the signal generation unit when the power state of the second power corresponds to the limited power state.

The power supply unit may include: a switching unit including at least two switches connected between an input power terminal to which the input power is input and a ground in series and switching the input power; a transformer unit transforming a voltage level of the power switched by the switching unit; a first output unit stabilizing output power from the transformer unit to output a pre-set first power; and a second output unit stabilizing output power from the transformer unit to output a pre-set second power.

The transformer unit may include: a resonant tank providing an inductor-inductor-capacitor (LLC) resonating operation of the switching unit; and a transformer including a primary winding receiving switched power from the switching unit and a first secondary winding and a second secondary winding forming a pre-set wiring ratio with the primary winding and outputting the first power and the second power, respectively.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings.

The invention may, however, be embodied in many different forms and should not be construed as being limited to the embodiments set forth herein.

Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

It will be understood that when an element is referred to as being "connected with" another element, it can be directly connected with the other element or intervening elements may also be present. In contrast, when an element is referred to as being "directly connected with" another element, there are no intervening elements present.

In addition, unless explicitly described to the contrary, the word "comprise" and variations such as "comprises" or "comprising," will be understood to imply the inclusion of stated elements but not the exclusion of any other elements.

Hereinafter, embodiments of the present invention will be described in detail with reference to the accompanying drawings.

Figure 1:
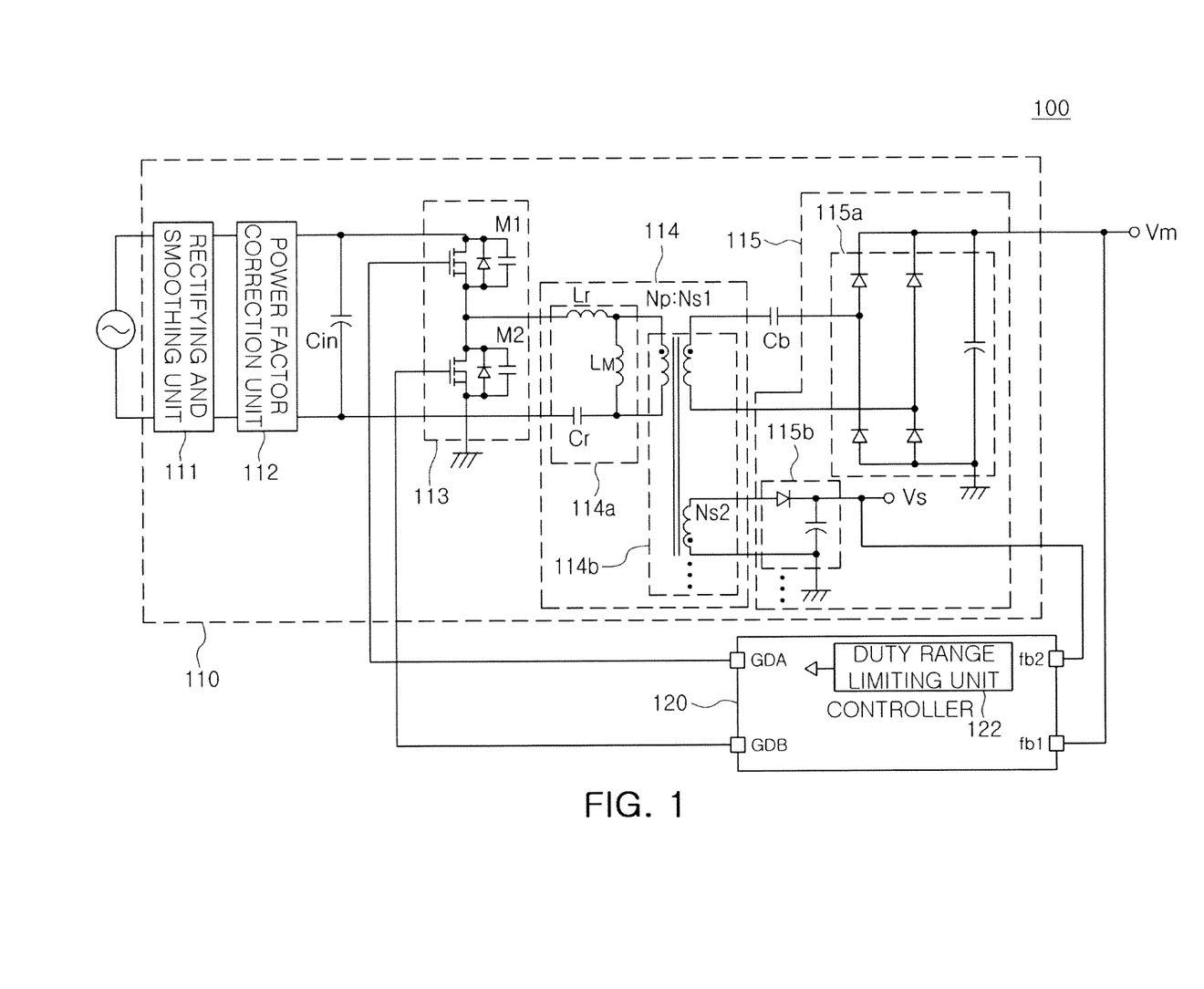
FIG. 1 is a schematic block diagram of a multi-output power supply apparatus according to an embodiment of the present invention.

FIG. 1 is a schematic block diagram of a multi-output power supply apparatus according to an embodiment of the present invention;

Referring to FIG. 1, a power supply apparatus according to an embodiment of the present invention may include a power supply unit 110, and a controller 120.

The power supply unit 110 may include a switching unit 113, a transformer unit 114, and output units 115 and 116, and may further include a rectifying and smoothing unit 111, and a power factor correction unit 112.

The rectifying and smoothing unit 111 may rectify and smooth alternating current (AC) power, and transfer the same to the power factor correction unit 112. The power factor correction unit 112 may regulate a phase difference between a voltage and a current of the rectified power from the rectifying and smoothing unit 111 to correct a power factor, and in addition, the power factor correction unit 112 may regulate a current waveform of the rectified power to follow a voltage waveform to thus correct a power factor.

The switching unit 113 may include at least two switches M1 and M2 stacked between an input power terminal to which direct current (DC) power from the power factor correction unit 112 is input and a ground, and perform a power conversion operation through an alternate switching operation of the first switch M1 and the second switch M2.

The transformer unit 114 may include a resonant tank 114a and a transformer 114b. The resonant tank 114a may provide an inductor-inductor-capacitor (Lr, Lm, Cr) (LLC) resonating operation, and one inductor Lm among them may be a magnetizing inductor of the transformer 114b.

The transformer 115b may include a primary winding Np and a plurality of secondary windings Ns1 and Ns2. The primary winding Np and the plurality of secondary windings Ns1 and Ns2 may be electrically insulated from one another.

Namely, the primary winding Np may be positioned on a primary side and the plurality of Ns1 and Ns2 may be positioned on a secondary side, and here, electrical properties of the primary side and the secondary side may be different.

The primary winding Np and the secondary winding Ns1 and Ns2 may have a pre-set winding ratio, and the secondary windings Ns1 and Ns2 may vary a voltage level according to the winding ratio to output power.

The output unit 115 may stabilize voltages from the plurality of secondary windings Ns1 and Ns2, respectively, and output a plurality of DC voltages Vm and Vs. The output unit 115 may include a plurality of output units 115a and 115b corresponding to the plurality of secondary wirings Ns1 and Ns2.

For example, when the plurality of secondary wirings Ns1 and Ns2 are a first secondary wiring Ns1 and a second secondary wiring Ns2, the output unit 115 may include a first output unit 115a and a second output unit 115b.

Namely, the first output unit 115a may rectify and stabilize first power Vm from the first secondary wiring Ns1 and output the same, and the second output unit 115b may rectify and stabilize second power Vs from the second secondary winding Ns2 and output the same.

The controller 120 may be formed in the secondary side. Upon receiving feedback of a power state of the second output unit 115b, the controller 120 may control a switching duty of the switching unit 113 positioned in the primary side.

In detail, the controller 120 may control a switching duty of the switching unit 113 according to a feedback signal fb2 indicating a power state of the second power Vs of the second output unit 115b to control a power level of the second power Vs.

Also, the controller 120 may control a switching frequency of the switching unit 113 according to a feedback signal fb1 indicating a power state of the first power Vm of the first output unit 115a to thus control a power level of the first power Vm.

Meanwhile, in the multi-output power supply apparatus 100 according to an embodiment of the present invention, a switching duty of the switches M1 and M2 of the switching unit 113 may be varied according to a load state of an output terminal. Here, in order to maintaining balancing between the first and second voltages Vm and Vs, if the load state of the output terminal corresponds to a pre-set limited power state, the controller 120 may limit a range of the switching duty of the switching unit 113. This will be described in detail with reference to FIGS. 2 through 5.

Figure 2:
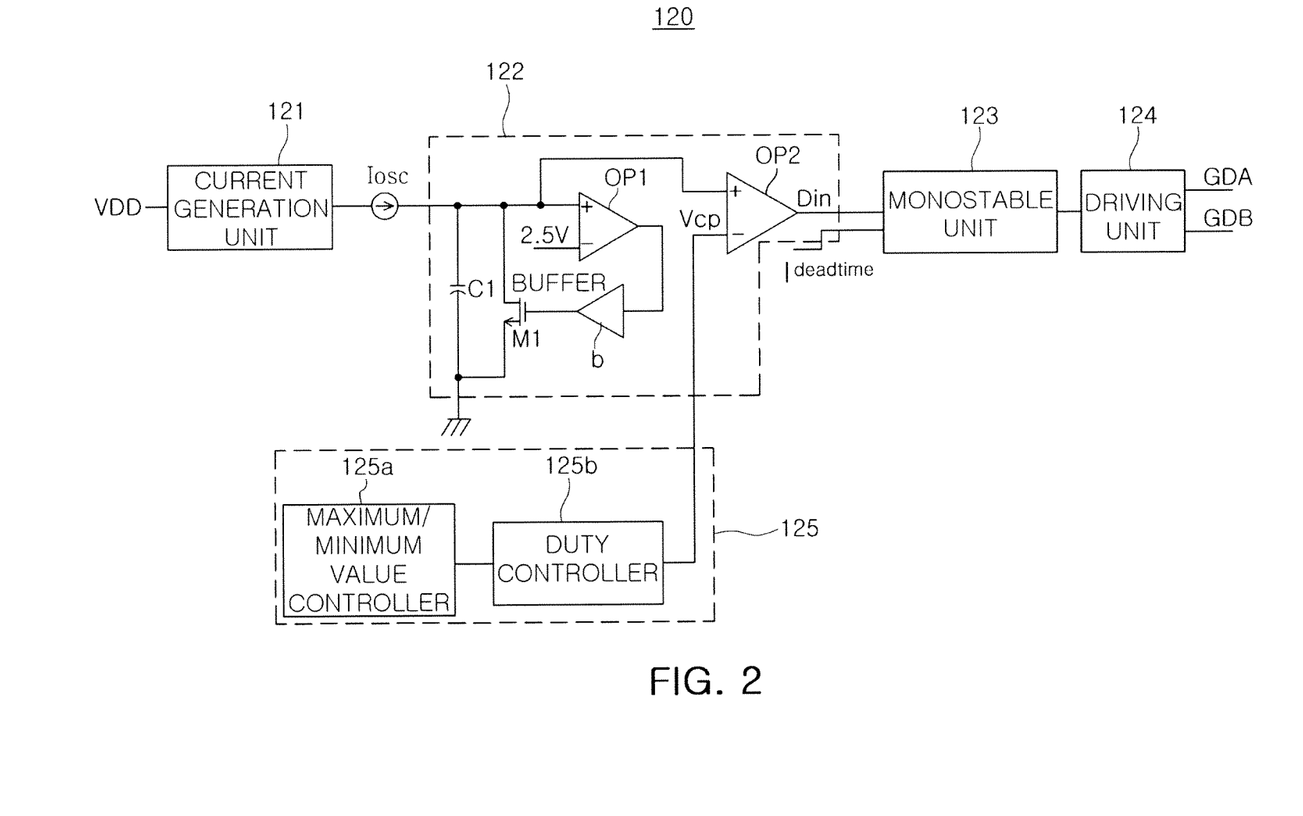
FIG. 2 is a schematic block diagram of a controller employed in the multi-output power supply apparatus according to an embodiment of the present invention.
Figure 3:
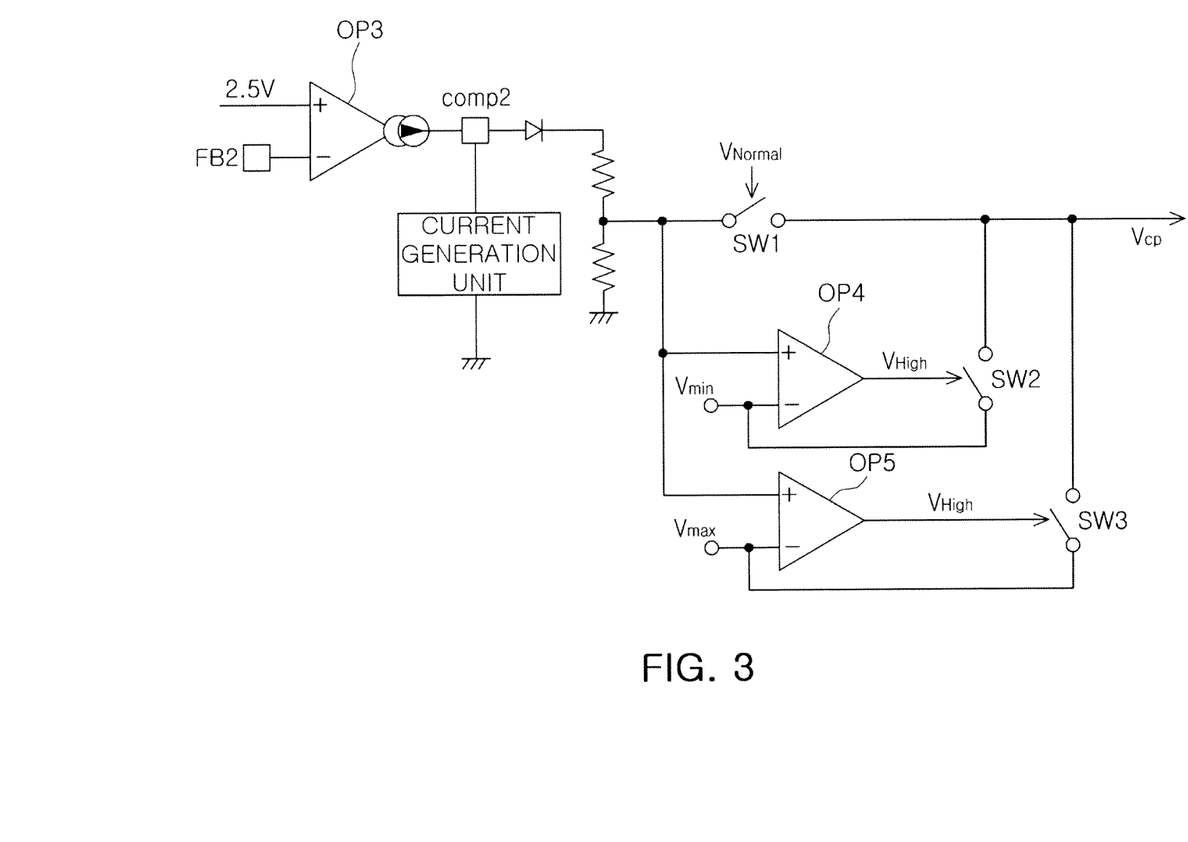
FIG. 3 is a circuit diagram of a duty controller of a duty range limiting unit employed in the controller of FIG. 2.
Figure 4:
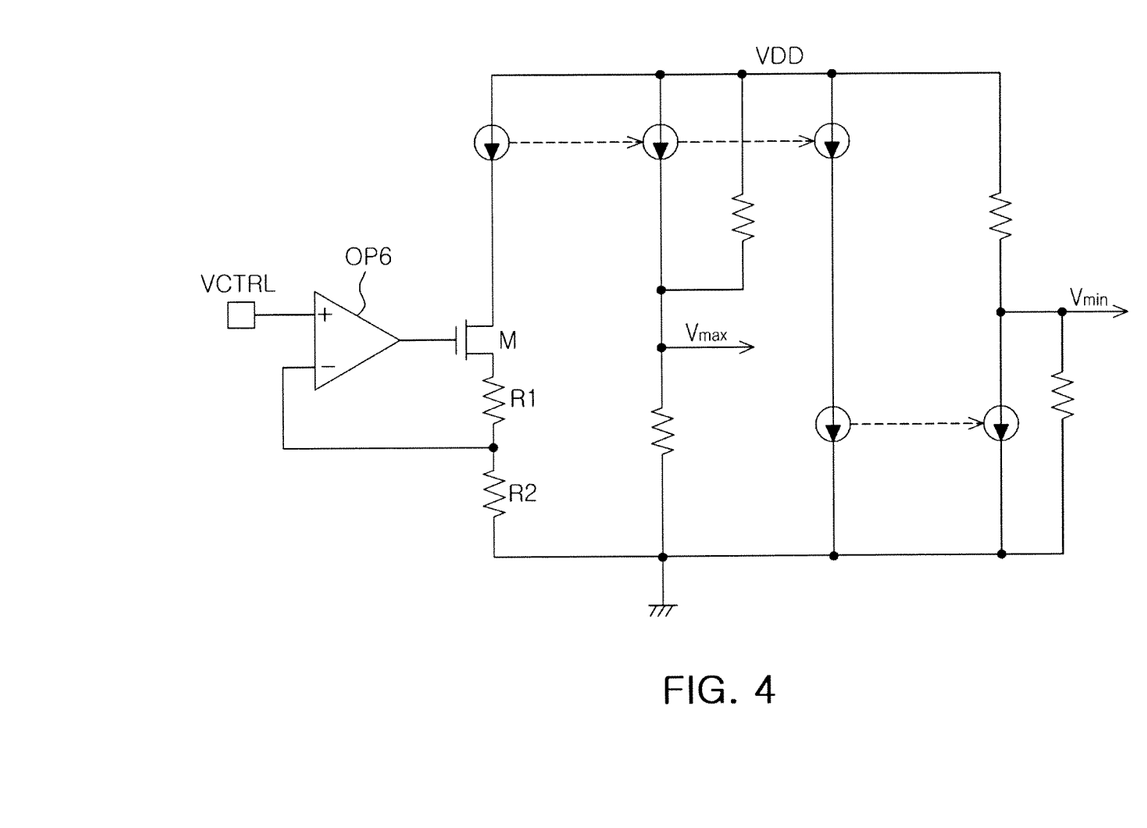
FIG. 4 is a schematic circuit diagram of a maximum/minimum value controller of the duty range limiting unit employed in the controller of FIG. 2.
Figure 5:
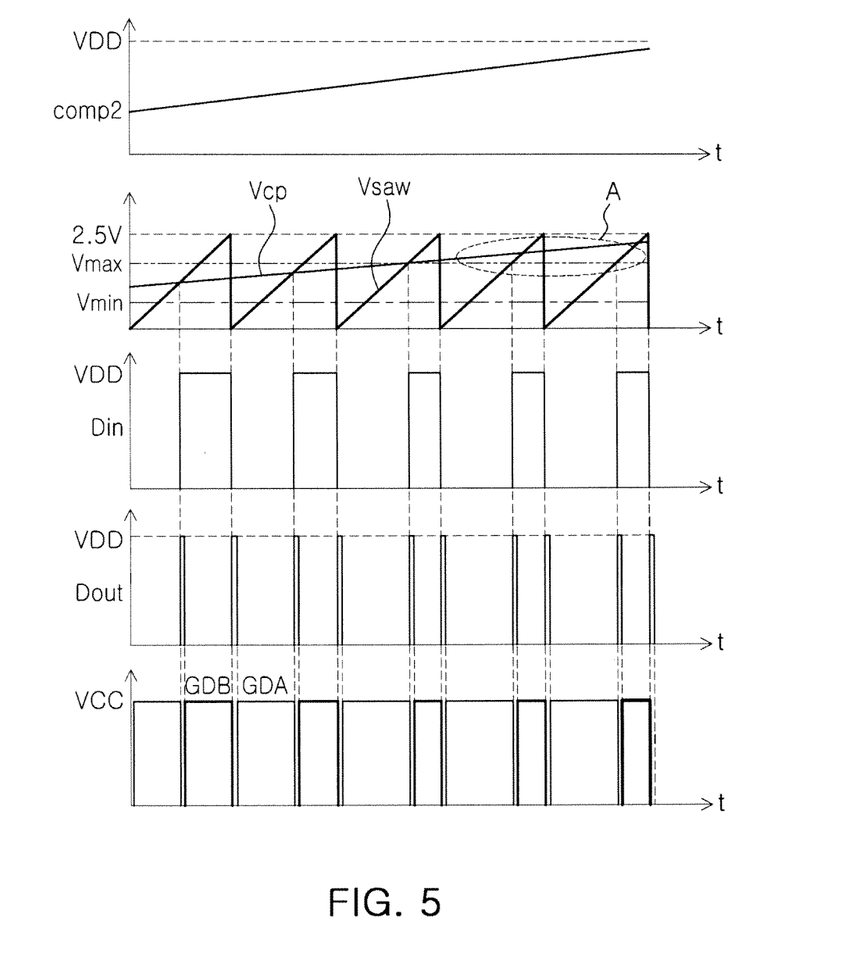
FIG. 5 is a graph showing operational waveforms of a major part of the multi-output power supply apparatus according to an embodiment of the present invention.

FIG. 2 is a schematic block diagram of a controller employed in the multi-output power supply apparatus according to an embodiment of the present invention. FIG. 3 is a circuit diagram of a duty controller of a duty range limiting unit employed in the controller of FIG. 2. FIG. 4 is a schematic circuit diagram of a maximum/minimum value controller of the duty range limiting unit employed in the controller of FIG. 2. FIG. 5 is a graph showing operational waveforms of a major part of the multi-output power supply apparatus according to an embodiment of the present invention.

Referring to FIG. 2, the controller 120 employed in the multi-output power supply apparatus 100 according to an embodiment of the present invention may include a current generation unit 121, a signal generation unit 122, a monostable unit 123, a driving unit 124, and a duty range limiting unit 125.

Upon receiving power VDD, the current generation unit 121 may generate a current and transfer the generated current to the signal generation unit 122. When normally operated, the current generation unit 121 may provide a normal current Iosc.

The signal generation unit 122 may include a capacitor C1, a switch Q1, a first comparator OP1, a second comparator OP2, and a buffer unit b. The signal generation unit 122 may generate a sawtooth signal according to a current charged to or discharged from the capacitor C1, and transfer a pulse signal according to the sawtooth signal to the monostable unit 123.

In detail, the capacitor C1 may charge and discharge a current delivered from the current generation unit 121 according to a switching operation of the switch Q1. The first comparator OP1 may compare a level of the voltage charged in the capacitor C1 with a pre-set first reference voltage Vref (e.g., 2.5V), and control switching of the switch Q1 according to the comparison result. The buffer unit b may buffer a comparison result signal from the first comparator OP1 and transfer the same to the switch Q1.

Accordingly, the voltage level of the capacitor C1 may have such a form as a sawtooth signal Vsaw as illustrated in FIG. 5, and the second comparator OP2 may compare the sawtooth signal with a voltage selected by the duty range limiting unit 125, and provide a pulse signal Din to the monostable unit 123.

The monostable unit 123 may receive the pulse signal Din and a pre-set dead time Ideadtime, and transfer a pulse signal having a dead time to the driving unit 124. Based on the pulse signal from the monostable unit 123, the driving unit 124 may provide switching control signals GDA and GDB for driving the switches M1 and M2 of the switching unit 113.

Namely, based on the current Iosc level from the current generation unit 121, a duration for which a current is charged in the capacitor C1 may be controlled, and accordingly, frequencies of the switching control signals GDA and GDB may be controlled.

Meanwhile, the duty range limiting unit 125 may limit a maximum value and a minimum value of a second voltage Vcp provided to the signal generation unit 122, so that duties of the switching control signals GDA and GDB can be limited to within a pre-set duty range according to a load state of the output terminal. In particular, the duty range limiting unit 125 may limit a duty of the switching control signal GDB to within a pre-set duty range according to a load state of the output terminal from which the second power Vs is output.

To this end, the duty range limiting unit 125 may include a maximum/minimum value controller 125a and a duty controller 125b.

Referring to FIG. 3, the duty controller 125b may include a first comparator OP3, a comparator group having a plurality of comparators OP4 and OP5, and a switch group having a plurality of switches SW1, SW2, and SW3.

The first comparator OP3 may compare a feedback signal FB2 indicating a power state of the second power Vs with a voltage (e.g., 2.5V) indicating a pre-set limited power state and output a comparison result comp2.

A power level of the comparison result comp2 may be compensated for by a power compensation unit and subsequently transferred to the comparator group and the switch group.

The comparator group may include a second comparator OP4 and a third comparator OP5. The second comparator OP4 and the third comparator OP5 compare the divided comparison results with a maximum value Vmax and a minimum value Vmin from the maximum/minimum value controller 125a, respectively, and control providing of a path for the first to third switches SW1, SW2, and SW3 of the switch group according to the corresponding comparison results or the comparison result from the first comparator OP3.

For example, when a power state of the second power Vs does not correspond to a limited power state, the first switch SW1 is electrically connected by a control signal Vnormal while the second and third switches SW2 and SW3 are opened, so the comparison result from the first comparator op3 may be transferred to the signal generation unit 122 as a second voltage Vcp.

When the power state of the second power Vs corresponds to a limited power state, the first switch SW1 is opened by the control signal Vnormal and the second comparator OP4 and the third comparator OP5 may compare the divided comparison result with the maximum value Vmax and the minimum value Vmin from the maximum/minimum value controller 125a and electrically connects the second or third switch SW2 or SW3 to transfer the maximum value Vmax or the minimum value Vmin to the signal generation unit 122 to limit a duty of the pulse signal of the signal generation unit 122, thereby limiting a duty of the switching control signal GDB of the driving unit 124.

Referring to FIG. 4, the maximum/minimum value controller 125a may include a fourth comparator OP6, a switch M, and a current mirroring circuit.

The fourth comparator OP6 may control a current flowing to the switch M from a current source by an external control signal VCTRL, and the current mirroring circuit mirrors a current flowing in the switch M by the current source to set the maximum value Vmax and the minimum value Vmin. To this end, the current source of the current mirroring circuit may be freely set in a connection relationship thereof.

The foregoing operation will be described with reference to FIG. 5. As a voltage level of the second power Vs is lowered, the comparison result COMP2 obtained by comparing the feedback signal fb2 indicating a voltage level of the second power Vs with the reference voltage 2.5V is increased, and accordingly, the second voltage Vcp determining a duty of the switching control signal GDB is increased.

Finally, a duty of the switching control signal GDA is determined according to the comparison result obtained by comparing the second voltage Vcp with the sawtooth signal Vsaw, and in this case, as the voltage level of the second voltage Vcp is increased, a duty of the switching control signal GDB is reduced, generating a power imbalance between the first power Vm and the second power Vs.

Thus, when the second voltage Vcp is equal to or higher than a predetermined voltage, the duty range limiting unit 125 may provide the pre-set maximum value to the signal generation unit 122 to limit a maximum value of the duty of the switching control signal GDB.

Accordingly, it can be seen that, even if the second voltage Vcp is increased, the duty of the switching control signal GDB is not reduced to below the minimum value by the pre-set maximum value Vmax (Please see reference letter A).

As set forth above, according to embodiments of the invention, since a variable range of a switching duty is limited according to a load state, multiple output voltages can be maintained in a balanced state.

While the present invention has been shown and described in connection with the embodiments, it will be apparent to those skilled in the art that modifications and variations can be made without departing from the spirit and scope of the invention as defined by the appended claims.

What is claimed is:

1. A multi-output power supply apparatus comprising:
   a power supply unit switching input power to output a plurality of voltages whose power levels are determined according to a switching operation; and
   a controller detecting power states of at least some of the plurality of voltages from the power supply unit, and limiting a range of a switching duty of the power supply unit to a pre-set range when the detected power states correspond to a pre-set limited power state,
   wherein the controller comprises:
   a duty range limiting unit comprising a maximum/minimum value controller setting a maximum value and a minimum value of a pulse signal according to a control signal indicating that states of some voltages correspond to the limited power state, and a duty controller limiting a duty range of the pulse signal according to the maximum value and the minimum value from the maximum/minimum value controller,
   wherein the maximum/minimum value controller comprises:
   a switch performing a switching on a current from a current source;
   a comparator controlling switching of the switch by comparing the control signal with a detection signal obtained by detecting the current flowing in the switch; and
   a current mirroring circuit setting the maximum value and the minimum value by mirroring the current flowing from the current source according to the switching of the switch.

2. The multi-output power supply apparatus of claim 1, wherein the controller comprises:
   a current generation unit generating a current according to the power states of the at least some of the plurality of voltages output from the power supply unit;
   a signal generation unit generating the pulse signal having a frequency determined according to the current generated by the current generation unit;
   a monostable unit determining a timing according to the pulse signal from the signal generation unit; and
   a driving unit generating a switching signal for controlling the switching operation of a switching unit according to a timing of the monostable unit.

3. The multi-output power supply apparatus of claim 1, wherein the power supply unit comprises:
   a switching unit including at least two switches connected between an input power terminal to which the input power is input and a ground in series and switching the input power;
   a transformer unit transforming a voltage level of the power switched by the switching unit; and
   an output unit stabilizing output power from the transformer unit to output a plurality of voltages.

4. The multi-output power supply apparatus of claim 3, wherein the transformer unit comprises:
   a resonant tank providing an inductor-inductor-capacitor (LLC) resonating operation of the switching unit; and
   a transformer including a primary winding receiving switched power from the switching unit and a plurality of secondary windings forming a pre-set wiring ratio with the primary winding and outputting the plurality of voltages.

5. The multi-output power supply apparatus of claim 3, wherein the power supply unit further comprises:

a rectifying and smoothing unit rectifying and smoothing alternating current (AC) power; and a power factor correction unit correcting a power factor of a DC power from the rectifying and smoothing unit and supplying DC power which power factor is corrected to the switching unit.

6. A multi-output power supply apparatus comprising:

a power supply unit switching input power to output a plurality of voltages whose power levels are determined according to a switching operation; and a controller detecting power states of at least some of the plurality of voltages from the power supply unit, and limiting a range of a switching duty of the power supply unit to a pre-set range when the detected power states correspond to a pre-set limited power state, wherein the controller comprises:

a duty range limiting unit comprising a maximum/minimum value controller setting a maximum value and a minimum value of a pulse signal according to a control signal indicating that states of some voltages correspond to the limited power state, and a duty controller limiting a duty range of the pulse signal according to the maximum value and the minimum value from the maximum/minimum value controller, wherein the duty controller comprises:

a comparator comparing a pre-set reference voltage with a detected power state;

a comparator group including a plurality of comparators comparing a comparison result from the comparator with the maximum value and the minimum value, respectively; and a switch group including a plurality of switches switching a signal path to provide a corresponding signal according to the comparison result from the comparator and the comparison results from the plurality of comparators of the comparator group.

7. A multi-output power supply apparatus comprising:

a power supply unit switching input power to output a first power and a second power whose power levels are determined according to a switching operation; and a controller detecting a power state of the second power from the power supply unit, and limiting a range of a switching duty of the power supply unit to a pre-set range when the detected power state corresponds to a pre-set limited power state, wherein the controller comprises:

a duty range limiting unit comprising a maximum/minimum value controller setting a maximum value and a minimum value of a pulse signal according to a control signal indicating that states of some voltages correspond to the limited power state; and a duty controller limiting a duty range of the pulse signal according to the maximum value and the minimum value from the maximum/minimum value controller, wherein the duty controller comprises:

a comparator comparing a pre-set reference voltage with a detected power state;

a comparator group including a plurality of comparators comparing a comparison result from the comparator with the maximum value and the minimum value, respectively; and a switch group including a plurality of switches switching a signal path to provide a corresponding signal according to the comparison result from the comparator and the comparison results from the plurality of comparators of the comparator group.

8. The multi-output power supply apparatus of claim 7, wherein the controller comprises:

a current generation unit generating a current according to the power state of the second power output from the power supply unit;

a signal generation unit generating the pulse signal having a frequency determined according to the current generated by the current generation unit;

a monostable unit determining a timing of a signal according to the pulse signal from the signal generation unit; and a driving unit generating a switching signal for controlling the switching operation of a switching unit according to a timing of the monostable unit.

9. The multi-output power supply apparatus of claim 7, wherein the power supply unit comprises:

a switching unit including at least two switches connected between an input power terminal to which the input power is input and a ground in series and switching the input power;

a transformer unit transforming a voltage level of the power switched by the switching unit;

a first output unit stabilizing output power from the transformer unit to output the first power; and a second output unit stabilizing output power from the transformer unit to output the second power.

10. The multi-output power supply apparatus of claim 9, wherein the transformer unit comprises:

a resonant tank providing an inductor-inductor-capacitor (LLC) resonating operation of the switching unit; and a transformer including a primary winding receiving switched power from the switching unit and a first secondary winding and a second secondary winding forming a pre-set wiring ratio with the primary winding and outputting the first power and the second power, respectively.

11. The multi-output power supply apparatus of claim 9, wherein the power supply unit further comprises:

a rectifying and smoothing unit rectifying and smoothing alternating current (AC) power; and a power factor correction unit correcting a power factor of the DC power from the rectifying and smoothing unit and supplying DC power which power factor is corrected to the switching unit.

12. A multi-output power supply apparatus comprising:

a power supply unit switching input power to output a first power and a second power whose power levels are determined according to a switching operation; and a controller detecting a power state of the second power from the power supply unit, and limiting a range of a switching duty of the power supply unit to a pre-set range when the detected power state corresponds to a pre-set limited power state, wherein the controller comprises:

a duty range limiting unit comprising a maximum/minimum value controller setting a maximum value and a minimum value of a pulse signal according to a control signal indicating that states of some voltages correspond to the limited power state; and a duty controller limiting the duty range of the pulse signal according to the maximum value and the minimum value from the maximum/minimum value controller, wherein the maximum/minimum value controller comprises:

a switch performing a switching to allow a current from a current source to flow;

a comparator controlling switching of the switch by comparing the control signal with a detection signal obtained by detecting the current flowing in the switch; and a current mirroring circuit setting the maximum value and the minimum value by mirroring the current flowing from the current source according to the switching of the switch.

* * * * *